(12) United States Patent
Doyle

(10) Patent No.: US 7,548,350 B2
(45) Date of Patent: Jun. 16, 2009

(54) METHOD AND APPARATUS FOR INTERACTIVELY SCANNING IMAGES INTO A LOGICAL STRUCTURE

(75) Inventor: Brian P. Doyle, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 993 days.

(21) Appl. No.: 10/393,292

(22) Filed: Mar. 20, 2003

(65) Prior Publication Data

US 2003/0197896 A1 Oct. 23, 2003

Related U.S. Application Data

(60) Provisional application No. 60/365,847, filed on Mar. 20, 2002.

(51) Int. Cl.
*H04N 1/04* (2006.01)

(52) U.S. Cl. .................. 358/474; 358/501; 358/505; 358/1.15; 382/305; 395/135; 705/26; 709/217

(58) Field of Classification Search .............. 358/474, 358/1.16, 1.15, 1.17, 500, 404, 524, 402, 358/505, 403, 458, 468, 518; 707/530; 395/500, 395/139; 382/306, 305; 705/26, 28; 709/217
See application file for complete search history.

(56) References Cited

U.S. PATENT DOCUMENTS

| 5,243,381 | A | | 9/1993 | Hube |
| 5,355,447 | A | * | 10/1994 | Knowlton ................. 345/670 |
| 5,442,732 | A | | 8/1995 | Matysek et al. |
| 5,461,459 | A | | 10/1995 | Muramatsu et al. |
| 5,701,183 | A | * | 12/1997 | Bellemare et al. ........... 358/404 |
| 5,715,381 | A | | 2/1998 | Hamilton |
| 5,887,171 | A | * | 3/1999 | Tada et al. ................. 719/317 |
| 5,930,552 | A | | 7/1999 | Ikeda |
| 6,040,920 | A | * | 3/2000 | Ichiriki ..................... 358/403 |
| 6,091,929 | A | | 7/2000 | Yamazaki et al. |
| 6,100,994 | A | | 8/2000 | Schliekelmann et al. |
| 6,201,610 | B1 | | 3/2001 | Ogino |
| 6,219,502 | B1 | | 4/2001 | Osari et al. |
| 6,285,842 | B1 | | 9/2001 | Katamoto et al. |
| 6,427,032 | B1 | * | 7/2002 | Irons et al. ................. 382/306 |
| 6,430,601 | B1 | * | 8/2002 | Eldridge et al. ............. 709/206 |
| 6,499,665 | B1 | * | 12/2002 | Meunier et al. ............. 235/487 |
| 7,016,081 | B2 | * | 3/2006 | Araki et al. ................ 358/3.26 |
| 7,016,091 | B2 | * | 3/2006 | Kurakata ................... 358/524 |
| 7,039,856 | B2 | * | 5/2006 | Peairs et al. ............... 715/500 |
| 7,194,679 | B1 | * | 3/2007 | Green ....................... 715/513 |
| 2002/0019778 | A1 | * | 2/2002 | Isaacson et al. ............. 705/26 |
| 2003/0103232 | A1 | * | 6/2003 | Twede ...................... 358/1.15 |
| 2004/0145775 | A1 | * | 7/2004 | Kubler et al. .............. 358/1.15 |

* cited by examiner

*Primary Examiner*—Negussie Worku
(74) *Attorney, Agent, or Firm*—Kunzler & McKenzie

(57) ABSTRACT

A method and system for scanning a set of documents is disclosed. The set of documents to be scanned are in an organizational format wherein groups of the documents are separated by barriers. The method and system include displaying a set of logical entities that represent the barriers to an operator of a scanner; and associating scanned images of the documents with at least one of the logical entities. The method and system further include using the association of the logical entities to store the scanned images, such that the organizational format of the documents is retained.

15 Claims, 4 Drawing Sheets

METHOD AND APPARATUS FOR INTERACTIVELY SCANNING IMAGES INTO A LOGICAL STRUCTURE

CROSS REFERENCE TO RELATED APPLICATION

This application is claiming under 35 USC 119(e) the benefit of provisional patent application serial no. 60/365,847 filed on Mar. 20, 2002.

FIELD OF THE INVENTION

The present invention relates to the field of scanning documents into images and storing the images as electronic files. More specifically, the present invention relates to the intelligent and interactive control of such functions and the storing of the scanned images into a logical structure.

BACKGROUND OF THE INVENTION

When converting business or scientific documents from paper to electronic images, the documents often have an organization format where groups of the documents are physically separated by some type of barrier, such as boxes, staples, clips, binders, rubber bands, and even by document type (e.g., figures and text). During scanning of the documents, it is often necessary or desirable to associate the scanned images with each other to retain the original organizational format. However, existing scan capture programs provide the ability to do so only into fixed, flat structures, if at all. For example, using currently available scanner products, scanned images can be associated with one another by being placed into "documents" and/or a "batch". These structures are extremely limited and their implementations are typically cumbersome.

For instance, scanner products exist that allow "slipsheets" to be interspersed among documents prior to scanning. The slipsheets include barcodes or other symbols that the scanner can recognize in order to delimit groups of images and associate them with a structure of some sort. The physical handling of such slipsheets is complicated and cumbersome and attempting to allow many different logical structures to be indicated using such a method is especially difficult and prone to error. Such a solution is also quite slow and errors are impossible to detect or rectify until the documents have already been stored and/or printed out erroneously.

One example of an application where a more complex logical structure would be desirable is where an operator must scan a series of documents, which are bound together in various ways and the operator wishes to represent the various bound document subsets as a logical structure of the document images. For instance, there could be two documents, each having three pages which are stapled together, those two documents could be paper-clipped together and binder-clipped to another document of five stapled pages. Finally, this binder-clipped set of documents could be in a folder with still another document including three pages which are paper-clipped together. To represent such relationships in a logical structure would require four levels of nesting that allows various nesting relationships between the possible binding methods (i.e., stapled documents can be binder-clipped with other stapled documents or with paper-clipped documents, or with other binder-clipped documents, and so on). One could also imagine other situations where scanned documents could be related to one another in a complex, logical fashion. Current scanner products are incapable of capturing such organizational formats of documents to be scanned.

Accordingly, what is needed is an improved method for scanning documents in which the relationships between the documents are retained and associated with the scanned images. The present invention addresses such a need.

SUMMARY OF THE INVENTION

The present invention provides a method and system for scanning a set of documents. The set of documents to be scanned are in an organizational format wherein groups of the documents are separated by barriers. The method and system include displaying a set of logical entities that represent the barriers to an operator of a scanner; and associating scanned images of the documents with at least one of the logical entities. The method and system further include using the association of the logical entities to store and print the scanned images, such that the organizational format of the documents is retained.

According to the method and system disclosed herein, the present invention provides an interactive and easy-to-use scanning application that retains designated relationships between documents during scanning, and that stores the scanned images along with those designated relationships. The scanner application also enables an operator to optionally print the images in such a way that the document relationships are apparent without reference to the original documents. In addition, the scanner application allows the operator to view the operator-defined logical relationships among the documents in an interactive fashion so that errors can be detected and rectified before the documents are finally scanned and stored.

DESCRIPTION OF THE INVENTION

The present invention relates to an improved method for the scanning and storing of documents. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
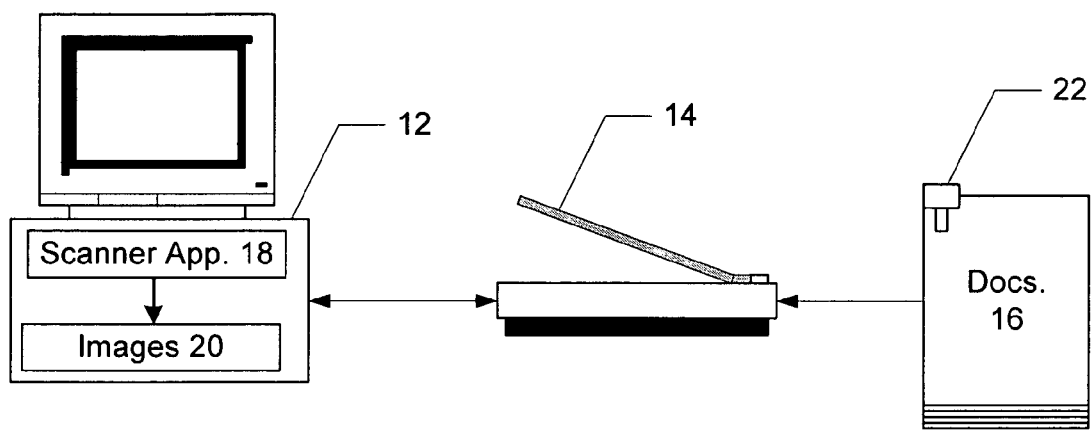
FIG. 1 is a block diagram of a scanning system in accordance with a preferred embodiment of the present invention.

FIG. 1 is a block diagram of a scanning system in accordance with a preferred embodiment of the present invention. The system includes a computer 12, a conventional scanner 14 that is in communication with the computer 12 for scanning a set of documents 16, and a scanner application 18 executed by the computer 12 that allows an operator to control the scanning operation. According to the present invention, the scanner application 18 allows the operator to interactively designate logical relationships between scanned images 20 in a manner that the organizational format of the original documents is retained after scanning. The scanned images 20 and the designated logical relationship between the images 20 are stored on the computer 12 (or other type of selected device). This allows the scanned images 20 to be printed and reassembled in the original organizational format without access to the original documents 16.

In operation, the scanner operator would invoke the scanner application 18 when a set of documents 16 needed to be scanned to convert the paper copies into electronic format, resulting in scanned images 20. As described the above, the set of documents 16 are typically organized such that groups of the documents are physically separated by some type of barrier 22, such as staples, clips, binders, rubber bands, and document type. One example of a specific situation is when an operator is scanning, and potentially copying, a set of legal documents 16. Such a situation will often require the copies to be produced in the exact format as the originals. In other words, if the originals were stapled and contained within a paper clip with other originals within a folder enclosed in a rubber band, the application 18 must produce the copies with the necessary barriers 22 (staples, clips, etc.) in place while maintaining the sequential order of the originals so that the copies are exact replica of the original files.

Figure 2:
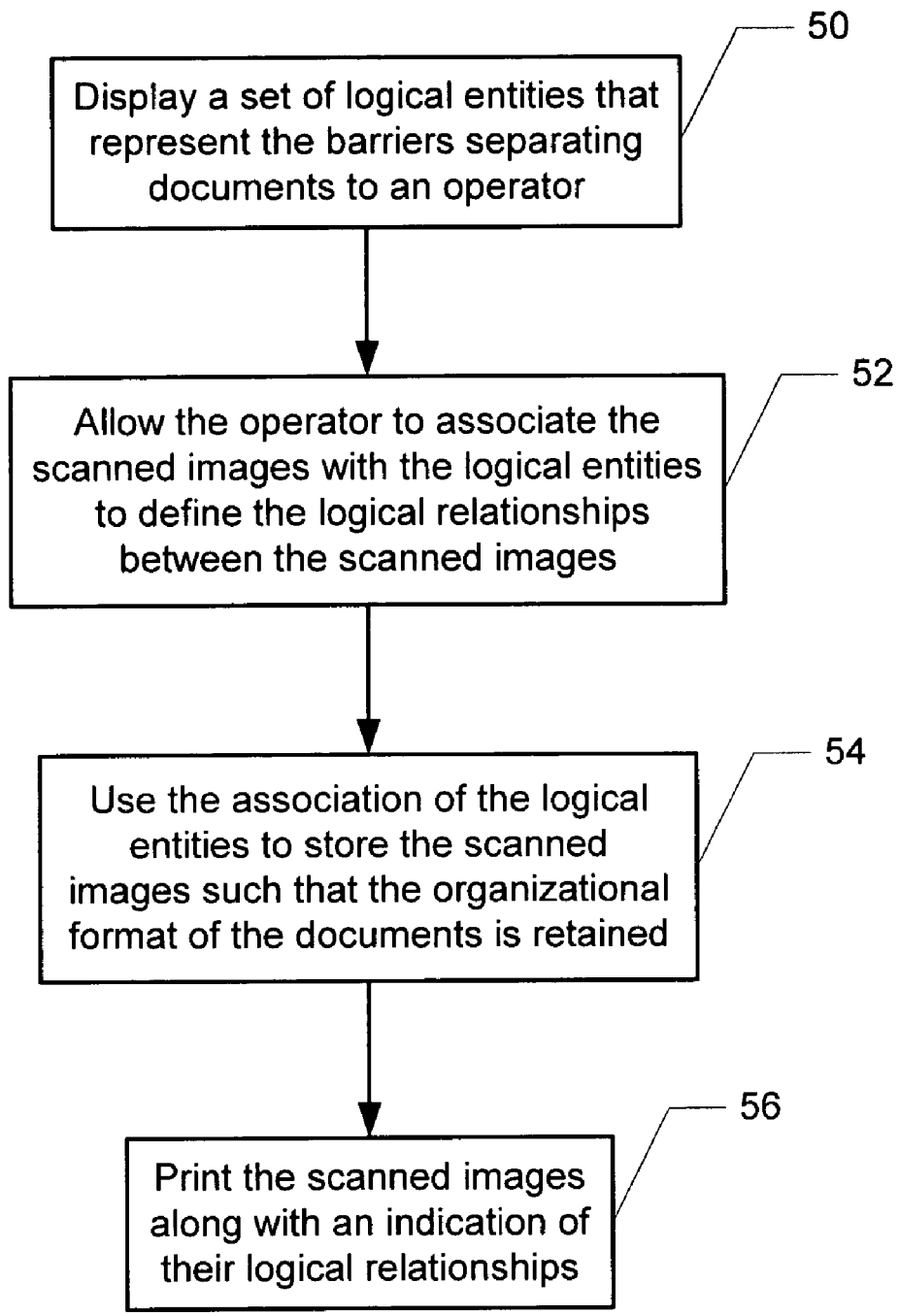
FIG. 2 is a flow chart illustrating the process the scanner application performs to enable an operator to interactively scan a set of documents into a logical structure that represents the organizational format of those documents.

FIG. 2 is a flow chart illustrating the process the scanner application 18 performs to enable an operator to interactively scan a set of documents 16 into a logical structure that represents the organizational format of those documents 16. The process begins in step 50 by displaying a set of logical entities that represent the barriers 22 separating the documents 16 to an operator of the scanner application 18. According to the present invention, the scanner application 18 displays a graphical user interface (GUI) to present a set of buttons or menus with text or icons, where each button represents a type of logical entity that corresponds to the barriers 22 separating the documents 16.

Figure 3:
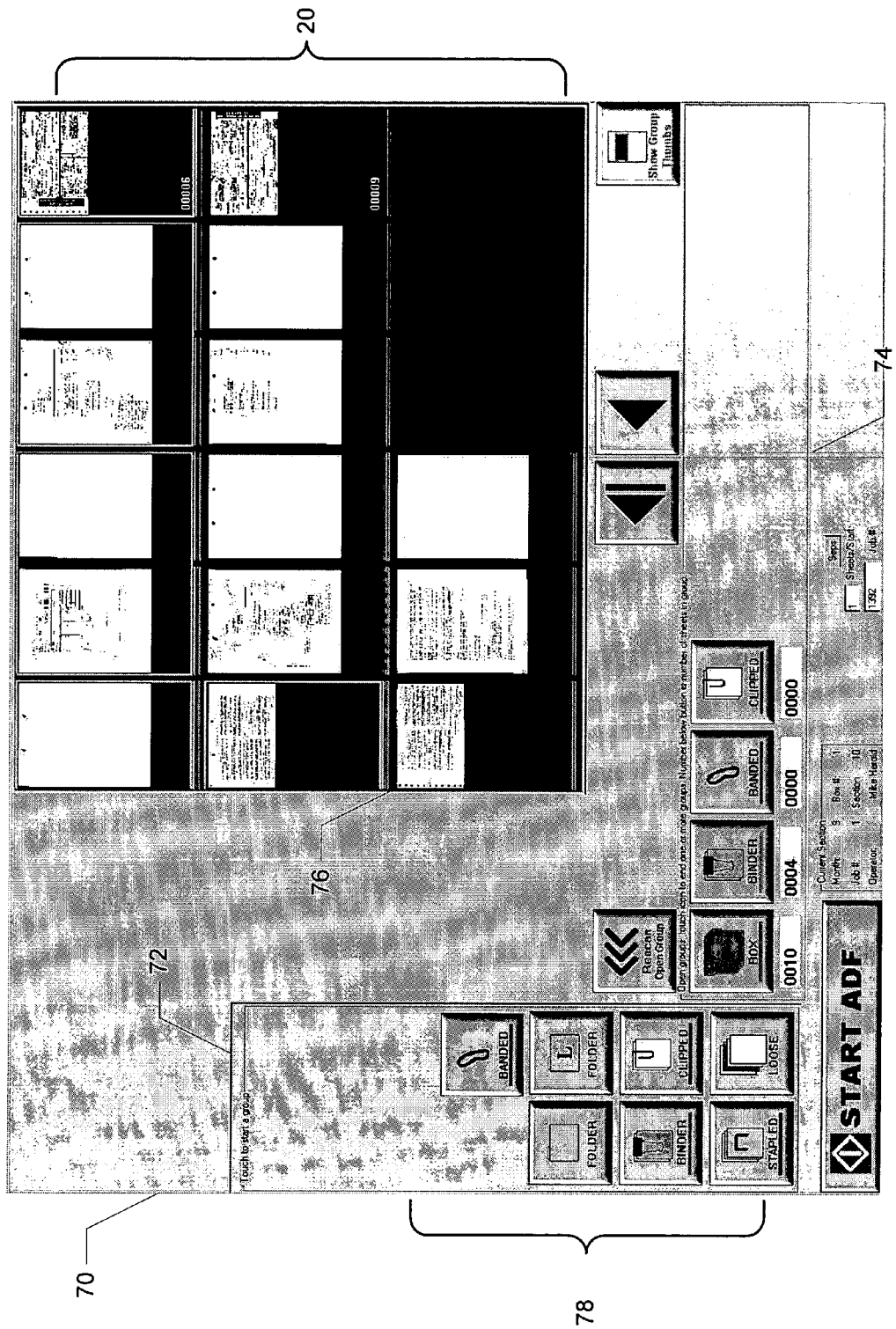
FIG. 3 is a diagram of one preferred embodiment of the user interface screen displayed by the scanner application.

FIG. 3 is a diagram of one preferred embodiment of the user interface screen displayed by the scanner application 16. In this embodiment, the screen 70 includes three sections, a "Touch to start a group" box 72, an "Open Groups" box 74, and an image display box 76. The "Touch to start a group" box 72 displays logical entities 78 in the form of icons for operator selection. The "Open Groups" box 74 displays which ones of the logical entities 78 the operator has selected and that represent open groups. And the image display box 76 displays thumbnails of the scanned images 20.

Referring again to FIG. 2, after the user interface screen 70 is displayed, the operator is allowed to associate the scanned images 20 of the documents 16 with at least one of the logical entities 78 in step 52 to define the logical relationships between the scanned images 20. Referring again to FIG. 3, before scanning the set of documents 16, the operator presses the icons for the logical entities 78 in the "Touch to start a group" box 72 to create the entities 78. As that occurs, an icon for the selected logical entities 78 appear in the "Open Groups" box 74 to show that those entities 78 are open. The operator repeats the selection of logical entities 78 as many times as necessary to indicate the structure enclosing the documents 16 to be scanned. As shown in the "Open Groups" box 74, the operator has opened several entities 78, but has not yet scanned any documents 16 into them.

Opening consecutive entities 78 without closing the previous entity creates nested entities 78. This can be repeated to an arbitrary nesting level depending on the requirements of the specific application. The operator may press one of those to "close" the entity 78 and any other entities 78 that it contains (represented by buttons to the right of the button pressed).

In a preferred embodiment, the scanner application 18 may forbid certain combinations of nesting according to application requirements. For example, some types of entities 78 may be deemed incapable of being nested within themselves, such as a "Box". In the example, shown, the icon for the "Box" entity 78 shown in the "Open Groups" box 74 disappeared from the choices in the "Touch to start a group" box 72 after selection because a box entity 78 cannot contain itself as a matter of convention. Closing an entity 78 in the "Open Groups" box 74 causes the application 18 to either remove those buttons or dims them to indicate to the operator the state of the system. The operator continues in this manner to construct the structure or relationships of all of the images 20 in the job.

As a specific example of scanning documents 16 in accordance with the present invention, consider the example set of documents described in above that contains two documents paper-clipped together, both having three stapled pages, and where the those two documents are binder-clipped to another document of five stapled pages. Finally, this binder-clipped set of documents is in a folder with still another document including three pages that are paper-clipped together.

The operator would interact with the application 18 to associate the images with logical entities 78 as follows. The operator would press the folder, binder, paper clip and staple button, respectively, in the "Touch to start a group" box to open these logical entities 78. The first three-page document could then be scanned and the staple button pressed in the "Open Groups" box 74 to close that logical entity 78. The staple button would then be pressed again in the "Touch to start a group" box 72 to open another staple group logical entity 78. The next three-page document could then be scanned and the staple button pressed again in the "Open Groups" box 74 to close that logical entity. The paper clip button could then be pressed in the "Open Groups" box 72 to close that logical group. Alternatively, pressing the paper clip button in the "Open Groups" box 72 without closing the staple button would close the paper clip logical group AND the staple logical group contained within it—achieving the same end result with one less press of a button. Thus far, the operator has indicated that the first three-page document is stapled, the second three-page document is stapled and that these two documents are paper-clipped together.

The staple button in the "Touch to start a group" box 72 would be pressed again to start a new staple logical group. The next document, a five-page document, could then be scanned and the staple button in the "Open Groups" box 74 pressed, indicating that those five pages are stapled together. The binder button in the "Open Groups" box 72 could then be pressed, indicating that the five-page stapled document is included in the binder clip with the other two documents which were paper-clipped together. Again, the binder button in the "Open Groups" box 74 could be pressed without first closing the staple logical group and this would close both the binder group and the staple group contained within it.

Next, the paper clip button in the "Touch to start a group" box 72 would be pressed and the last document, a three-page document, could be scanned. Pressing the paper clip button in the "Open Groups" box 74 (or the folder button in the "Open Groups" box 72, as described above) would close that logical group and indicate that those three pages are paper-clipped together. Finally, the folder button in the "Open Groups" box 72 could be pressed, closing the final logical group and indicating that all of the above logical grouping are contained together within a folder.

Any other logical relationship between scanned images could be similarly implemented using the present invention. For instance, images representing figures could be grouped together, images representing tables could be grouped together, both of these could be grouped within the body of a document which could be grouped together with a table of contents, all of which would be included under an outline. A person with ordinary skill in the art will readily recognize that any number of logical relationships among images can be imagined, many requiring complex nesting capabilities. This invention will allow any such logical relationship to be interactively designated during the scanning process. The invention also allows the operator to associate unique or modal information with the entities 78 with other buttons, menus, or data fields on the screen. For example, the source of a group of images could be associated with an entity 78.

Referring still to FIG. 2, after the documents 16 are associated with the logical entities 78, the logical relationship defined by the association of logical entities 78 is used to store the scanned images 20, such that the organizational format of the documents 16 is retained in step 54. Thus, the present invention allows the scanner operator to designate the nested barriers 22 interactively as the scanning takes place.

In step 56, when the scanned images 20 are printed, some indication of their logical relationships is printed along with the images 20. In a preferred embodiment, the application 18 prints separator sheets with the images 20 that represent the barriers 22. This allows the printed images and their barriers 22 to be manually reconstructed without reference to, or even possession of the original documents 16. In the above example, for instance, separator sheets might be printed between the operator-defined logical groups in the following manner: [folder] [binder] [paper clip] [staple] three pages [staple], [staple] three pages [staple] [paper clip], [staple] five pages [staple] [binder], [paper clip] three pages [paper clip] [folder sheet]. In this manner, an operator printing the images could re-assemble them in the exact manner they originally appeared without any knowledge of, or access to, the original documents. Optionally, only a beginning separator sheet need be printed at the beginning of each logical group, rather than one at the beginning and one at the end of each group. Any other suitable method of indicating to an operator the logical relationships between the images upon printing could be used without diverting from the spirit and intent of the present invention.

In a further aspect of the present invention, the application 18 optionally and preferably provides a visual a graph or tree of the nested logical entities 78 and information associated with each entity 78 as the scanning progresses.

Figure 4:
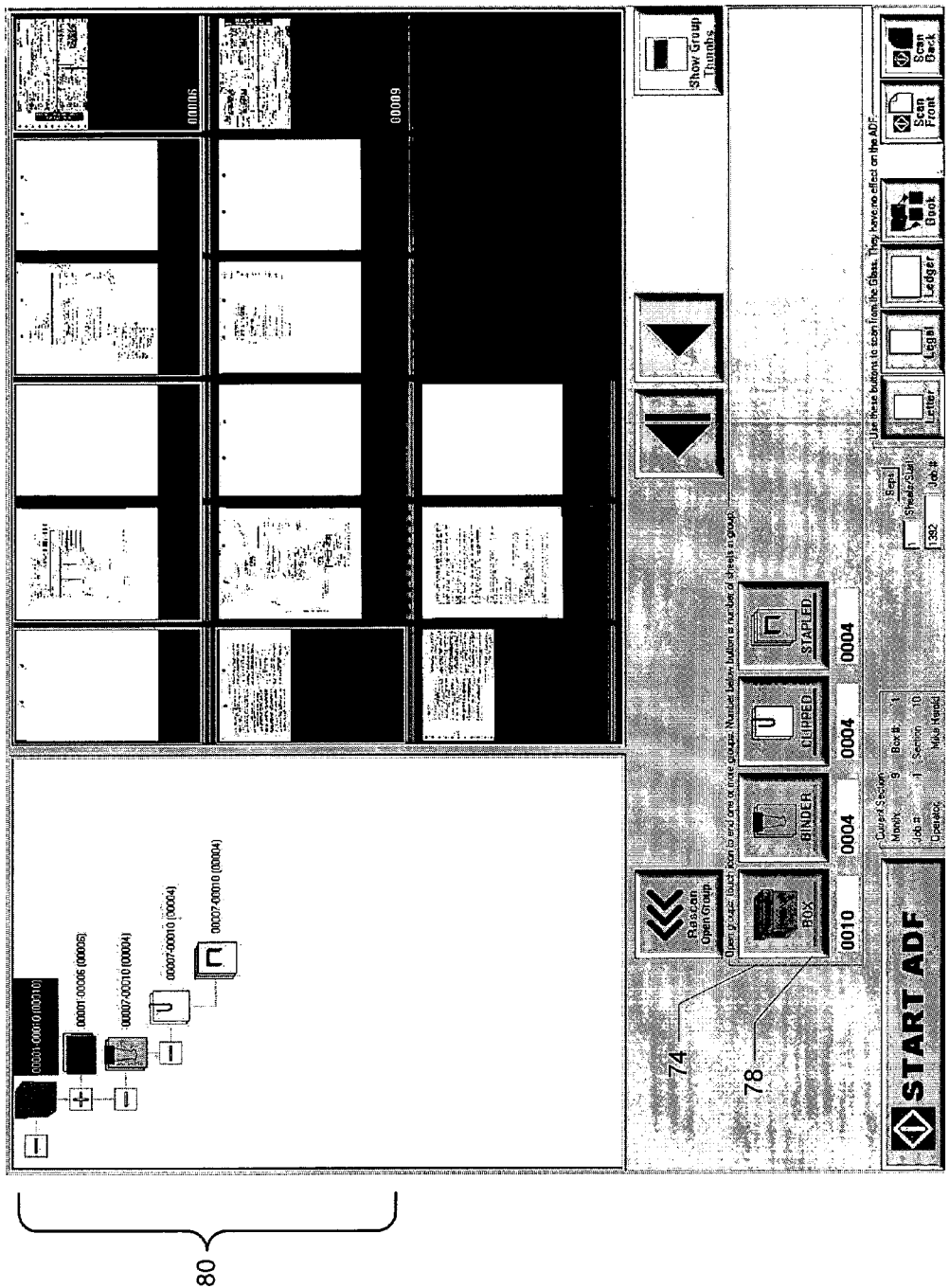
FIG. 4 is a diagram of a second preferred embodiment of the user interface screen displayed by the scanner application.

FIG. 4 is a diagram of a second preferred embodiment of the user interface screen displayed by the scanner application. In this embodiment, the logical entities 78 selected by the operator are displayed as nodes in a tree or other type of graph 80. The scanner application 18 allows the scanner operator to create a tree or other type of directed graph structure 80 into which each image 20 is positioned as the documents 16 are scanned. An image 20 can be placed within a logical entity 78 that is a node in the graph 80, for example, a "staple", which is itself placed in another entity 78, for example, a "paper clip", "document", or "folder", and the logical entities 78 can be nested arbitrarily, for example, a "folder" can contain another "folder", a "paper clip" can contain one or more "staples", etc. The association can be commutative, for example, a "folder" can contain a "paper clip", but a "paper clip" can also contain a "folder" if that makes sense for a specific application.

Additionally, the application 18 maintains information about each individual image or logical entity 78 in the graph structure 80, for example, the image name, the characteristics of the image (size, etc.) or the fact that a folder is "labeled" or not. Such a visual picture allows the operator to easily confirm that the images 20 are being properly grouped as the scanning progresses. Should an error occur, the operator may back up a step and rectify whatever misgrouping has taken place without having to restart the entire job. The invention can be implemented such that the logical grouping of images can be interactively manipulated even after all the images 20 have been scanned. In this way, if errors occur and are not discovered until the images 20 are stored or even printed, the scanning will not have to be done over.

As stated above, the application 18 causes the images to be stored along with the logical relationships between images 20. According to the present invention, the scanned images can be stored in a directory structure that corresponds to the graph structure 80 created by the operator, where directory names can be created from the logical entity names in the graph. This way, the operator can look at the directory structure for a set of images using any standard file system application and recognize how the original documents were organized, without the original documents and even without using the scanner application 18.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

I claim:

1. A method for scanning a set of paper documents having an organizational format wherein groups of the paper documents are separated by physical barriers, the method comprising the steps of:
    (a) displaying a set of logical entities that represent the physical barriers separating a group of the paper documents to an operator, wherein the physical barriers are selected from the folders, binders, boxes, staples, clips, and rubber bands;
    (b) associating a group of scanned images of the documents with at least one of the logical entities; and
    (c) using the association of the logical entities to store the group of scanned images, such that the organizational format of the documents is retained.

2. The method of claim 1 further including the step of: (d) printing an indication of the organizational format when printing the group of scanned images.

3. The method of claim 1 wherein step (a) further includes the step of: displaying the logical entities as nodes in a graph.

4. The method of claim 3 wherein step (a) further includes the step of: displaying which images are associated with each of the logical entities in the graph.

5. The method of claim 4 wherein step (c) further includes the step of: storing the group of scanned images in a directory structure that corresponds to the displayed graph, wherein directories in the directory structure correspond to the logical entities in the graph.

6. A computer-readable medium encoded with computer-executable instructions for scanning a set of paper documents having an organizational format wherein groups of the paper documents are separated by physical bafflers, the computer-executable instructions for:

(a) displaying a set of logical entities that represent the physical barriers separating a group of the paper documents to an operator, wherein the physical barriers are selected from folders, binders, boxes, staples, clips, and rubber bands;

(b) associating a group of scanned images of the documents with at least one of the logical entities; and (c) using the association of the logical entities to store the group of scanned images, such that the organizational format of the documents is retained.

7. The computer-readable medium of claim 6 further including the instruction of:

(d) printing an indication of the organizational format when printing the group of scanned images.

8. The computer-readable medium of claim 6 wherein instruction (a) further includes the instruction of: displaying the logical entities as nodes in a graph.

9. The computer-readable medium of claim 8 wherein instruction (a) further includes the instruction of: displaying which images are associated with each of the logical entities in the graph.

10. The computer-readable medium of claim 9 wherein step (c) further includes the step of: storing the group of scanned images in a directory structure that corresponds to the displayed graph, wherein directories in the directory structure correspond to the logical entities in the graph.

11. A scanner system, comprising:

a scanner for scanning a set of documents into images, wherein the set of paper documents have an organizational format wherein groups of the paper documents are separated by physical barriers that include any combination of staples, folders, binders, boxes, clips, rubber bands, and document types; and a scanner application for controlling operation of the scanner, the scanner application functioning for;

displaying a set of logical entities that represent the physical barriers separating a group of the paper documents to an operator;

associating a group of scanned images of the documents with at least one of the logical entities; and using the association of the logical entities to store the group of scanned images, such that the organizational format of the documents is retained.

12. The scanner system of claim 11, wherein the scanner application further functions to print an indication of the organizational format when printing the group of scanned images.

13. The scanner system of claim 11, wherein the scanner application further functions to display the logical entities as nodes in the graph.

14. The scanner system of claim 13, wherein the scanner application further functions to display which images are associated with each of the logical entities in the graph.

15. The scanner system of claim 13, wherein the scanner application further functions to store the group of scanned images in a directory structure that corresponds to the displayed graph, wherein directories in the directory structure correspond to the logical entities in the graph.

* * * * *